US011750580B2

(12) United States Patent
O'Connell et al.

(10) Patent No.: US 11,750,580 B2
(45) Date of Patent: Sep. 5, 2023

(54) SYSTEMS AND METHODS FOR ENCRYPTION IN NETWORK COMMUNICATION

(71) Applicant: Avast Software s.r.o., Prague (CZ)

(72) Inventors: Christopher Joseph O'Connell, Tucson, AZ (US); Barna Csukas, Miercurea Ciuc (RO); Gabor Miklos, Miercurea Ciuc (RO); Vitalii Sydorovych, Sidcup (GB); Rui Santos, Gondomar (PT); Michal Hojsík, Prague (CZ)

(73) Assignee: Avast Software s.r.o., Prague (CZ)

( * ) Notice: Subject to any disclaimer, the term of this patent is extended or adjusted under 35 U.S.C. 154(b) by 24 days.

(21) Appl. No.: 17/592,254

(22) Filed: Feb. 3, 2022

(65) Prior Publication Data

US 2023/0247010 A1    Aug. 3, 2023

(51) Int. Cl.
| | |
|---|---|
| *H04L 9/40* | (2022.01) |
| *H04L 9/32* | (2006.01) |
| *H04L 9/14* | (2006.01) |
| *H04L 9/30* | (2006.01) |
| *H04L 9/06* | (2006.01) |

(52) U.S. Cl.
CPC .......... *H04L 63/0457* (2013.01); *H04L 9/065* (2013.01); *H04L 9/14* (2013.01); *H04L 9/3073* (2013.01); *H04L 9/3242* (2013.01); *H04L 63/0435* (2013.01); *H04L 63/166* (2013.01)

(58) Field of Classification Search
None
See application file for complete search history.

(56) References Cited

U.S. PATENT DOCUMENTS

| | | | | |
|---|---|---|---|---|
| 10,511,591 | B2* | 12/2019 | Campagna | ............ H04L 63/061 |
| 2020/0195425 | A1* | 6/2020 | Mistry | .................. H04L 63/123 |
| 2022/0006835 | A1* | 1/2022 | Gray | ....................... H04L 9/085 |
| 2022/0164424 | A1* | 5/2022 | Keith, Jr. | .............. H04L 9/0866 |

(Continued)

OTHER PUBLICATIONS

Hulsing, Andreas et al., Post-quantum WireGuard, Cryptology ePrint Archive, Jun. 16, 2021, https://eprint.iacr.org/2020/379 pdf, accessed Nov. 10, 2021.

(Continued)

*Primary Examiner* — Trang T Doan
(74) *Attorney, Agent, or Firm* — Dovas Law, P.C.

(57) ABSTRACT

A system, computer-readable storage medium, and method for secure network communication. A first device employs a first secret to establish a stream between the first and a second device. A third key, first ciphertext based on a first key, and hash of the first key are received from the second device by the first. A second key is applied to recover a second secret from the first ciphertext. The third key is encrypted to generate a second ciphertext including a third secret. Fourth and fifth keys are derived based on the first, second, and third secrets. A message authentication code is generated based on the fourth and third keys, first ciphertext, hash of the first key, and second ciphertext. The second ciphertext and message authentication code are transmitted by the first to the second device, and the fifth key is employed by the first device to modify the stream.

31 Claims, 5 Drawing Sheets

(56) References Cited

U.S. PATENT DOCUMENTS

2022/0197985 A1* 6/2022 Keith, Jr. ............... G06V 40/70
2022/0209944 A1* 6/2022 Nix ...................... H04L 9/3263

OTHER PUBLICATIONS

Krawczyk et al., HMAC-based Extract-and-Expand Key Derivation Function (HKDF), Internet Engineering Task Force (IETF), Request for Comments: 5869, Category: Informational, ISSN: 2070-1721, May 2010.

* cited by examiner

SYSTEMS AND METHODS FOR ENCRYPTION IN NETWORK COMMUNICATION

FIELD OF INVENTION

The invention relates generally to network communication, and more particularly to encryption in network communication.

BACKGROUND

Although quantum computing is still in its infancy, it is well-established that a quantum computer with a sufficiently large bit size is capable of breaking classical public-key based secret exchanges, such as Diffie-Hellman and its variants. As a result, there exists a cryptographic arms race both to develop practical quantum computers of sufficient size and practicality, and to develop algorithms which preserve cryptographic guarantees in a world where quantum computers are available. There are a variety of contenders for such "post-quantum" algorithms, and a consensus has yet to emerge as to the best postquantum cryptographic primitive. Equally important, however, is the construction and use of these post-quantum primitives in a performant and compatible way, allowing the gradual adoption of post-quantum algorithms without requiring a wholesale replacement of existing technologies. Post-quantum encryption ("PQE") systems refer implicitly to the subset of currently accepted encryption systems that appear to be resistant to a quantum computer equipped attacker.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A computer-implemented method for secure network communication in a communication session is provided. The computer-implemented method includes performing by a first device a security handshake between the first device and a second device to generate a first secret and employing by the first device the first secret to establish a stream between the first device and the second device. A third key, a first ciphertext based on an encryption of a first key, and a hash of the first key are received from the second device by the first device via the stream. A second key is applied to recover a second secret from the first ciphertext. The third key is encrypted to generate a second ciphertext including a third secret. A key pair including a fourth key and a fifth key is derived based on the first secret, the second secret, and the third secret. A message authentication code is generated based on the fourth key, the third key, the first ciphertext, the hash of the first key, and the second ciphertext. The second ciphertext and the message authentication code are transmitted by the first device to the second device via the stream, and the fifth key is employed by the first device to modify the stream between the first device and the second device.

Further provided is a computer-implemented method for secure network communication between a first device and a second device. The computer-implement method includes receiving a first key and performing by the second device a security handshake between the first device and the second device to generate a first secret. The first secret is employed by the second device to establish a stream between the second device and the first device. The first key is encrypted to generate a first ciphertext including a second secret. A hash of the first key is generated. A second key, the first ciphertext, and the hash of the first key is transmitted by the second device to the first device via the stream. A second ciphertext and a first message authentication code are received by the second device from the first device via the stream. A third key is applied to recover a third secret from the second ciphertext. A fourth key and a fifth key are derived based on the first secret, the second secret, and the third secret. A second message authentication code is generated based on the fourth key, the second key, the first ciphertext, the hash of the first key, and the second ciphertext. The first message authentication code is compared to the second message authentication code. The fifth key is employed by the second device to modify the stream between the first device and the second device based on the comparison of the first message authentication code to the second message authentication code.

Further provided is a computer-implemented method for secure network communication in a Transport Layer Security session. The computer-implemented method includes providing a first key pair including a first public key and a first private key and performing by a server device a TLS handshake between the server device and a client device to generate a first secret. The first secret is employed by the server device to establish a stream between the server device and the client device. A second public key, a first ciphertext based on an encryption of the first public key, and a hash of the first public key are received from the client device by the server device via the stream. The first private key is applied to recover a second secret from the first ciphertext. The second public key is encrypted to generate a second ciphertext comprising a third secret. A second key pair comprising a first particular key and a second particular key is derived based on the first secret, the second secret, and the third secret. A message authentication code is generated based on the first particular key, the second public key, the first ciphertext, the hash of the first public key, and the second ciphertext. The second ciphertext and the message authentication code are transmitted by the server device to the client device via the stream. The second particular key is employed by the server device to modify the stream between the server device and the client device.

Further provided is a system including one or more processors and memory storing executable instructions that, as a result of being executed, cause the system to perform operations. The operations include performing by a first device a security handshake between the first device and a second device to generate a first secret and employing by the first device the first secret to establish a stream between the first device and the second device. The operations also include receiving from the second device by the first device via the stream a third key, a first ciphertext based on an encryption of a first key, and a hash of the first key and applying a second key to recover a second secret from the first ciphertext. The operations further include encrypting the third key to generate a second ciphertext comprising a third secret and deriving a key pair comprising a fourth key and a fifth key based on the first secret, the second secret, and the third secret. The operations yet further include generating a message authentication code based on the fourth key, the third key, the first ciphertext, the hash of the first key, and the second ciphertext, transmitting by the first device to the second device via the stream the second ciphertext and the message authentication code, and employing by the first device the fifth key to modify the stream between the first device and the second device.

A non-transitory computer-readable storage medium storing executable instructions for enabling secure network communication between a first device and a second device is also provided. The instructions are executable by one or more processors to perform operations comprising receiving a first key, performing by the second device a security handshake between the first device and the second device to generate a first secret, and employing by the second device the first secret to establish a stream between the second device and the first device. The operations also include encrypting the first key to generate a first ciphertext comprising a second secret, generating a hash of the first key, and transmitting by the second device to the first device via the stream a second key, the first ciphertext, and the hash of the first key. The operations further include receiving by the second device from the first device via the stream a second ciphertext and a first message authentication code, applying a third key to recover a third secret from the second ciphertext, and deriving a fourth key and a fifth key based on the first secret, the second secret, and the third secret. The operations yet further include generating a second message authentication code based on the fourth key, the second key, the first ciphertext, the hash of the first key, and the second ciphertext and comparing the first message authentication code to the second message authentication code. The operations further include employing by the second device the fifth key to modify the stream between the first device and the second device based on the comparison of the first message authentication code to the second message authentication code.

A further computer-implemented method for secure network communication in a communication session is provided. The further computer-implemented method includes employing by a first device a first secret to establish a stream between the first device and a second device. A third key, a first ciphertext based on an encryption of a first key, and a hash of the first key are received from the second device by the first device via the stream. A second key is applied to recover a second secret from the first ciphertext. The third key is encrypted to generate a second ciphertext including a third secret. A key pair including a fourth key and a fifth key is derived based on the first secret, the second secret, and the third secret. A message authentication code is generated based on the fourth key, the third key, the first ciphertext, the hash of the first key, and the second ciphertext. The second ciphertext and the message authentication code are transmitted by the first device to the second device via the stream, and the fifth key is employed by the first device to modify the stream between the first device and the second device.

BRIEF DESCRIPTION OF THE DRAWINGS

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein.

DETAILED DESCRIPTION OF ILLUSTRATIVE EMBODIMENT(S)

Figure 1:
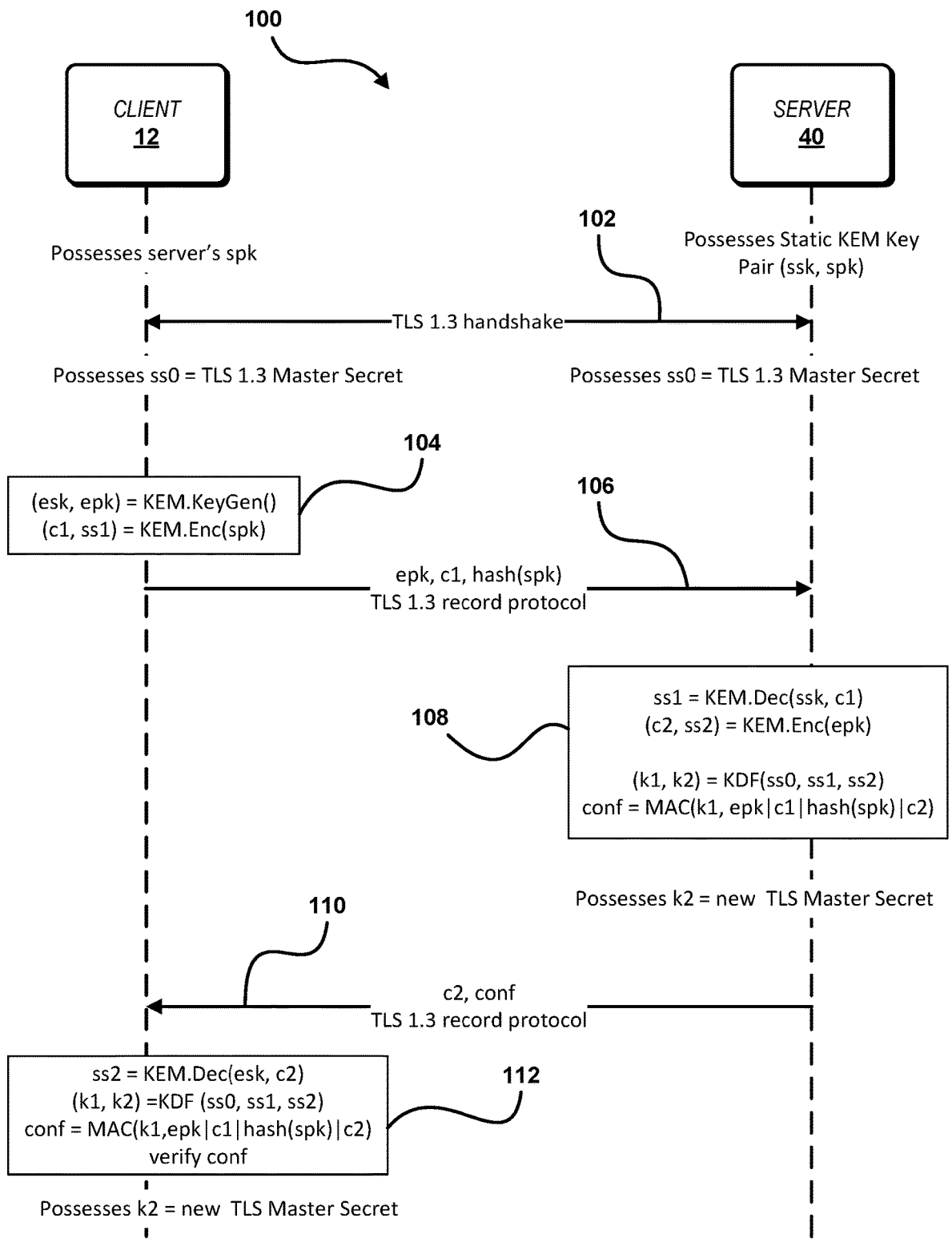
FIG. 1 is a diagram showing an encrypted connection upgrade process according to an illustrative embodiment.

Described herein are encryption schemes implemented via key exchanges enabling integration of a post-quantum. ("PQ") algorithm to a Transport Layer Security ("TLS") handshake. A PQ algorithm as described herein is an algorithm providing encryption resistant to a quantum computer equipped attacker. The described schemes preclude a passive eavesdropper using classical or quantum computing hardware from detecting that a PQ algorithm is in use. Such integration is not dependent on modifications (e.g., upgrades) to existing internet infrastructure or encryption protocols. Nevertheless, the herein described implementations may form the basis for modifications (e.g., upgrades) to internet infrastructure or encryption protocols, for example an extension to TLS version TLS 1.3 or a part of a future TLS version. The described implementations provide immediately available PQ encryption schemes which are backwards compatible with existing protocols and infrastructures.

As described herein, a key that is "ephemeral" (e.g., an "ephemeral key") is a cryptographic key that is generated for each execution of a key-establishment process and that meets other requirements of the key type (e.g., unique to each message or session).

As described herein, a key that is "static" (e.g., a "static key") is a key used for more than one instance of a cryptographic key-establishment scheme.

As described herein, a key that is "secret" (e.g., a "secret key" or a "secret") is a cryptographic key uniquely associated with one or more entities, that is used with a cryptographic algorithm, and that should not be made public. The use of the term "secret" in this context does not denote a classification level, but rather denotes a need to protect the key from disclosure.

As described herein, a key that is "public" (e.g., a "public key") is a cryptographic key uniquely associated with one or more entities, that is part of a key pair and is used with a public-key (asymmetric) cryptographic algorithm, and that may be made public.

As described herein, a key that is "private" (e.g., a "private key") is a cryptographic key uniquely associated with one or more entities, that is part of a key pair and is used with a public-key (asymmetric) cryptographic algorithm, and that should not be made public.

As described herein, a "ciphertext" is encrypted data.

As described herein, a "stream" is a data stream.

As described herein, a "key pair" includes two mathematically related keys having the property that one key can be used to encrypt a message that can be decrypted using the other key, a non-limiting example including a public key that can be used to encrypt a message that can be decrypted by a corresponding private key.

As described herein, reference to "first," "second," "third," "fourth," "fifth," or "sixth," components (e.g., a "first key," a "second key", and a "third key") is not used to show a serial or numerical limitation but instead is used to distinguish or identify the various components.

Referring to FIG. 1, an encrypted connection upgrade process 100 is provided which works on top of a transport layer security ("TLS") protocol, for example a standards compliant TLS 1.3 protocol. The connection upgrade process allows the addition of a PQ encryption-enabling key exchange, without requiring extensions to the TLS protocol. The PQ encryption enabling key ("PQE key") exchange is achieved via a "propose and commit" key exchange mechanism, which requires just one round trip. Further, since the exchange's PQE key can be combined with a classical TLS key, client software requires no modifications to its data format or management to benefit from the upgrade process 100, but rather just a library enabled for the upgrade process 100 in place of an existing TLS library. Moreover, because of the "propose and commit" nature of the PQE key exchange, a connection can be made using classical encryption, and the connection can be upgraded by the upgrade process 100 at any time without breaking the connection, changing the flow control state, or affecting any other synchronization enabled by the connection.

The upgrade process 100 works using an internal patching mechanism of a TLS encryption scheme (e.g., TLS 1.3). By appending a quantum-resistant encryption key to an already negotiated TLS key, quantum resistance is achieved. Alternatively, a quantum-resistant encryption key can replace an already negotiated TLS key. A client 12 and a server 40 are enabled to perform the process 100 which includes encryption negotiation. The client 12 and the server 40 operate in a computer network including one or more wired or wireless networks or a combination thereof, for example including a local area network (LAN), a wide area network (WAN), the internet, mobile telephone networks, and wireless data networks such as Wi-Fi™ and 3G/4G/5G cellular networks.

The upgrade process 100 beneficially begins with a standard TLS handshake (e.g., a TLS 1.3 handshake) that results in a master secret ss0 shared between the client 12 and the server 40 (step 102). For example, a TLS 1.3 handshake includes receiving by the server 40 a first key share and a first random number from the client 12, transmitting by the server 40 a second key share and a second random number to the client 12, transmitting by the server 40 a signed certificate to the client 12, and generating the master secret ss0 based on the first key share, the second key share, the first random number, and the second random number.

Next, the client 12 and the server 40 implement a PQE key exchange protocol over a TLS record protocol that creates a shared secret ss1 (step 104), derived using the server's static key encapsulation mechanism ("KEM") key, and creates a shared secret ss2 (step 108), derived from an ephemeral KEM key (ephemeral public key epk) generated by the client 12. A replacement TLS master secret, key k2, is computed from the master secret ss0, shared secret ss1, and shared secret ss2 (step 108), and the replacement TLS master secret, key k2, is used for all subsequent TLS record communication. The replacement TLS master secret, key k2, is appended to or replaces the original master secret ss0.

The PQE key exchange protocol of the upgrade process 100 relies on a PQE Key Encapsulation Mechanism ("KEM") for both authentication and key-exchange. Beneficially, the server 40 has a fixed KEM key pair including a static secret key ssk and a static public key spk and each client 12 has access to the server's static public key spk. This access can be achieved for example by adding (e.g., pinning) the key to client software rendered accessible by the server 40, which client software can be executed by the client 12 to enable the upgrade process 100. For clarity, the upgrade process 100 is described with the condition that the server 40 has only one fixed key pair (ssk, spk). Alternatively, the upgrade process 100 can utilize multiple key pairs and not rely on a single pinned public key. Alternatively, a public key infrastructure (PKI) can be employed for checking the keys of the server 40.

The key encapsulation mechanism ("KEM") includes three algorithms: a key generation algorthim KEM.KeyGen, a key encryption algorithm KEM.Enc, and a key decryption algorithm KEM.Dec. In a step 104, the client 12 randomly generates an ephemeral static key esk and an ephemeral public key epk by applying the key generation algorithm KEM.KeyGen as shown in equation 1. Further in the step 104, the client 12 wraps shared secrets ss1 into ciphertext c1 using the static public key spk of server 40 by applying the key encryption algorithm KEM.Enc to the static public key spk as shown in equation 2.

$$(esk, epk) = \text{KEM.KeyGen}() \qquad \text{eq. 1}$$

$$(c1, ss1) = \text{KEM.Enc}(spk) \qquad \text{eq. 2}$$

The client 12 generates a hash of the static public key spk of the server 40 hash(spk). To identify the static public key spk used by the client 12 for encapsulation, the client 12 sends the hash of the static public key spk of the server 40 hash(spk) to the server 40 along with the ephemeral public key epk and the ciphertext c1 over TLS protocol (e.g., TLS 1.3 record protocol) (step 106).

In step 108, the server 40 recovers the shared secret ss1 from the ciphertext c1 via the static secret key ssk by applying the key decryption algorithm KEM.Dec to the ciphertext c1 and the static secret key ssk as shown in equation 3. Also in step 108, the server 40 wraps a shared secret ss2 into a ciphertext c2 by applying the key encryption algorithm KEM.Enc to the ephemeral public key epk as shown in equation 4. Further in step 108, the server 40 derives a key k1 and a key k2 by applying a key derivation function ("KDF") to the master secret ss0, the shared secret ss1, and the shared secret ss2 as shown in equation 5. Yet further in step 108, the server 40 generates a confirmation conf by applying a message authentication code ("MAC") algorithm to the key k1 and to a concatenation of the ephemeral public key (epk), the ciphertext c1, the hash of the static public key spk, and the ciphertext c2 as shown in equation 6.

$$ss1 = \text{KEM.Dec}(ssk, c1) \qquad \text{Eq. 3}$$

$$(c2, ss2) = \text{KEM.Enc}(epk) \qquad \text{Eq. 4}$$

$$(k1, k2) = \text{KDF}(ss0, ss1, ss2) \qquad \text{Eq. 5}$$

$$conf = \text{MAC}(k1, epk|c1|hash(spk)|c2 \qquad \text{Eq. 6}$$

In a step 110, the server 40 transmits the ciphertext c2 and the confirmation conf to the client 12 over the TLS protocol (e.g., TLS 1.3 record protocol). In a step 112, the client 12 recovers shared secret ss2 from the ciphertext c2 via the ephemeral secret key esk by applying the key decryption algorithm KEM.Dec to the ciphertext c2 and the ephemeral secret key esk as shown in equation 7. Also in step 112, the client 12 derives the key k1 and the key k2 by applying the key derivation function ("KDF") to the master secret ss0, the shared secret ss1, and the shared secret ss2 as shown in equation 5. Further in step 112, the client 12 generates the confirmation conf by applying the message authentication code ("MAC") algorithm to the key k1 and to a concatenation of the ephemeral public key (epk), the ciphertext c1, the hash of the static public key spk, and the ciphertext c2 as shown in equation 6, and the client 12 confirms that the confirmation conf received from the server 40 is the same as confirmation conf that the client 12 generates.

$$ss2 = \text{KEM.Dec}(esk, c2) \qquad \text{Eq. 7}$$

Key encapsulations described herein are beneficially performed by implementing Supersingular Isogeny Key Encapsulation ("SIKE"). Key derivations described herein are beneficially performed by implementing the HKDF key derivation function ("KDF") which is defined in the Request for Comments ("RFC") 5869 of the Internet Engineering Task Force ("IETF"), including HKDF-Extract and HKDF-Expand with a dedicated context string. For the message authentication code ("MAC"), the upgrade process 100 beneficially utilizes uses a hash-based message authentication code ("HMAC"). For key encapsulations, the KDF, and the MAC other cryptographic algorithms can be substituted, and the herein described exemplary protocols are non-limiting. The upgrade process 100 enables a backwards compatible PQ upgrade over existing encryption protocols and is not dependent on specific cryptographic primitives. A benefit of the upgrade process 100 is the construction of the key exchange, and in the context of TLS protocol, the arrangement with standard TLS primitives (e.g., TLS 1.3 primitives).

The static KEM key pair (ssk, spk) of the server 40 and the key confirmation message conf provide explicit server-to-client authentication as only the server 40 with the possession of the static secret key ssk is able to decapsulate the ciphertext c1 to obtain the shared secret ss1 and compute the key confirmation message conf using correct key k1. The upgrade process 100 accordingly enables a protocol which is secure against active, and implicitly, passive quantum attackers.

Figure 2:
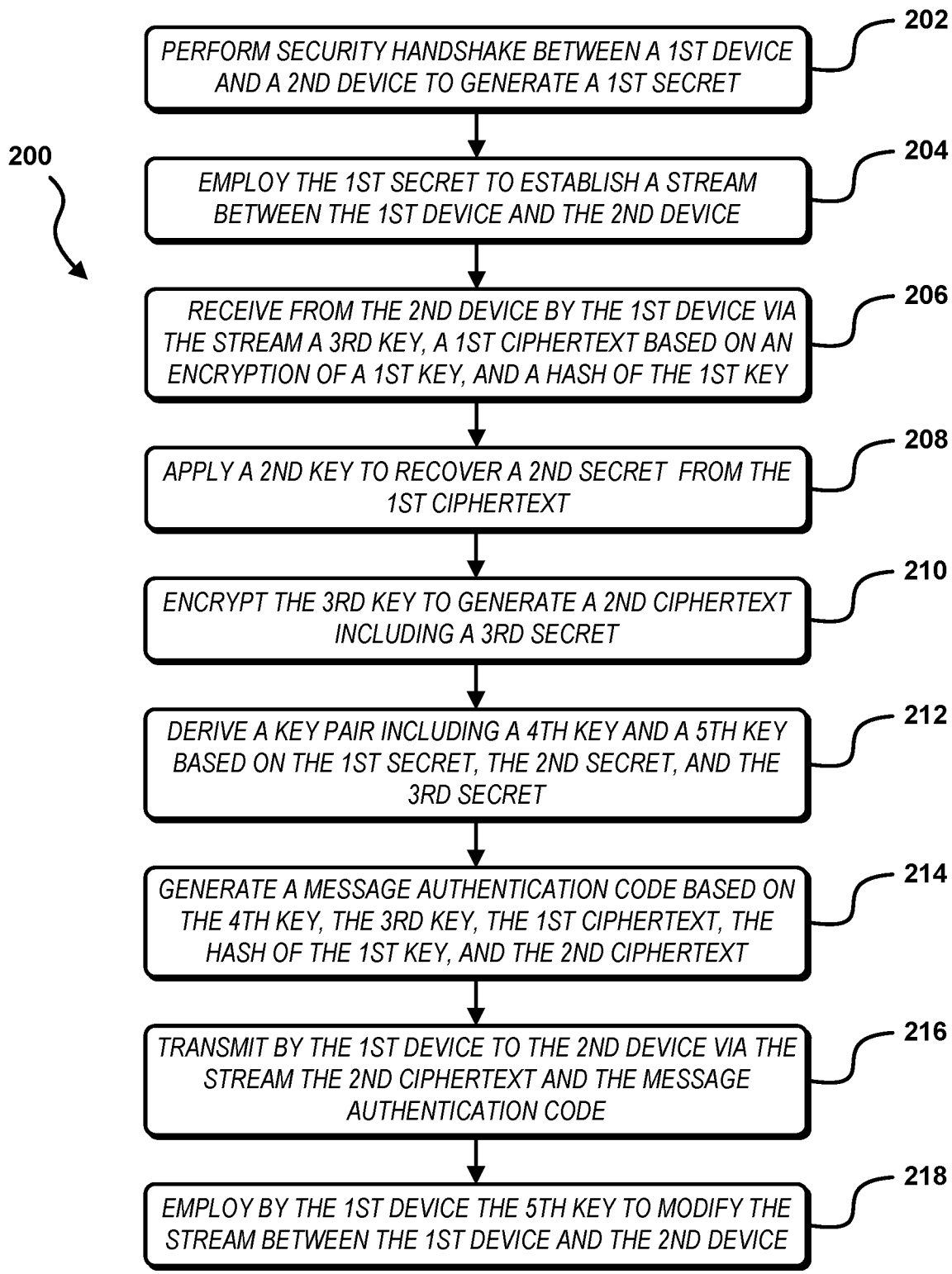
FIG. 2 is a diagram showing a method for secure network communication.

Referring to FIG. 2, a method 200 for secure network communication in a communication session is shown. The method 200 is described with reference to the components (e.g., server 40, client 12) and features (e.g., master secret ss0, shared secret ss1, shared secret ss2) of the upgrade process 100. Alternatively, the method 200 can be performed via other components and features, and the method 200 is not restricted to being performed via the components and features of the upgrade process 100.

In a step 202, a security handshake is performed by a first device (e.g., server 40) between the first device and a second device (e.g., client 12) to generate a first secret (e.g., master secret ss0). The handshake is also performed by the second device (e.g., client 12) with the first device (e.g., server 40). In a particular implementation, the communication session can be a Transport Layer Security ("TLS") session, and the security handshake can be a TLS handshake. Alternatively, the first secret (e.g., master secret ss0) can be generated or provided in other manner without implementation of a handshake.

The first secret (e.g., master secret ss0) is employed by the first device (e.g., server 40) to establish a stream between the first device and the second device (e.g., client 12) (step 204). The stream can be established over a TLS record protocol (e.g., TLS 1.3 record protocol). The first secret (e.g., master secret ss0) is also employed by the second device (e.g., client 12) in establishing the stream between the first device (e.g., server 40) and the second device.

A third key (e.g., ephemeral public key epk), a first ciphertext (e.g., ciphertext c1) based on an encryption of a first key (e.g., static public key spk), and a hash (e.g., hash(spk)) of the first key is received from the second device (e.g., client 12) by the first device (e.g., server 40) via the stream (step 206). A second key (e.g., static secret key ssk) is applied to recover a second secret (e.g., shared secret ss1) from the first ciphertext (e.g., ciphertext c1) (step 208).

Beneficially, the first key (e.g., static public key spk) and the second key (e.g., static secret key ssk) are static keys, and the third key (e.g., ephemeral public key epk) is an ephemeral key. In a particular implementation of the method 200, the first key can include a first public key (e.g., static public key spk), the second key can include a first private key (e.g., static secret key ssk), and the third key can include a second public key (e.g., ephemeral public key epk).

The third key (e.g., ephemeral public key epk) is encrypted to generate a second ciphertext (e.g., ciphertext c2) including a third secret (e.g., shared secret ss2) (step 210). The second key (e.g., static secret key ssk) can be applied via a post-quantum key encapsulation mechanism to recover the second secret (e.g., shared secret ss1) from the first ciphertext (e.g., ciphertext c1). The second secret (e.g., shared secret ss1) beneficially includes a static secret. The third key (e.g., ephemeral public key epk) can be encrypted via the post-quantum key encapsulation mechanism to generate the second ciphertext (e.g., ciphertext c2) including the third secret (e.g., shared secret ss2). The third secret (e.g., shared secret ss2) beneficially includes an ephemeral secret. The post-quantum key encapsulation mechanism beneficially includes supersingular isogeny key encapsulation ("SIKE").

A key pair including a fourth key (e.g., key k1) and a fifth key (e.g., key k2) is derived based on the first secret (e.g., master secret ss0), the second secret (e.g., shared secret ss1), and the third secret (e.g., shared secret ss2) (step 212). Beneficially, the first secret (e.g., master secret ss0) is symmetric and the fifth key (e.g., key k2) is symmetric. The fourth key (e.g., key k1) and the fifth key (e.g., key k2) can be derived based on the first secret (e.g., master secret ss0), the second secret (e.g., shared secret ss1), and the third secret (e.g., shared secret ss2) for example via a key derivation function ("KDF") based on a hash-based message authentication code ("HMAC").

The first key (e.g., static public key spk) and the second key (e.g., static secret key ssk) can be provided as a first key pair including a first public key (e.g., static public key spk) and a first private key (e.g., static secret key ssk). The fourth key (e.g., key k1) and the fifth key (e.g., key k2) can be derived for example as a second key pair.

A message authentication code ("MAC") (e.g., MAC(k1, epk|c1|hash(spk)|c2)) is generated based on the fourth key (e.g., key k1), the third key (e.g., ephemeral public key epk), the first ciphertext (e.g., ciphertext c1), the hash (e.g., hash(spk)) of the first key (e.g., static public key spk), and the second ciphertext (e.g., ciphertext c2) (step 214). A message authentication code generator can be provided, and the fourth key (e.g., key k1) can be input as a first input to the message authentication code generator. The third key (e.g., ephemeral public key epk), the first ciphertext (e.g., ciphertext c1), the hash (e.g., hash(spk)) of the first key (e.g., static public key spk), and the second ciphertext (e.g., ciphertext c2) can be concatenated to form a concatenated string (e.g., epk|c1|hash(spk)|c2). The concatenated string (e.g., epk|c1|hash(spk)|c2) can be input as a second input to the message authentication code generator, and the message authentication code (e.g., MAC(k1, epk|c1|hash(spk)|c2)) can be generated by the message authentication code generator based on the first input and the second input.

The second ciphertext (e.g., ciphertext c2) and the message authentication code ("MAC") are transmitted by the first device (e.g., server 40) to the second device (e.g., client 12) via the stream (step 216). The fifth key (e.g., key k2) is employed by the first device (e.g., server 40) to modify the stream (e.g., over TLS 1.3 record protocol) between the first device and the second device (e.g., client 12) (step 218). Beneficially, the fifth key (e.g., key k2) is appended to the first secret (e.g., master secret ss0) to modify the stream (e.g., over TLS 1.3 record protocol) between the first device (e.g., server 40) and the second device (e.g., client 12). Alternatively, the first secret (e.g., master secret ss0) can be replaced with the fifth key (e.g., key k2) to modify the stream (e.g., over TLS 1.3 record protocol) between the first device (e.g., server 40) and the second device (e.g., client 12).

The handshake can be initiated by the second device (e.g., client 12), and is performed by the first device (e.g., server 40) and the second device (e.g., client 12). Performing by the first device (e.g., server 40) the security handshake can include receiving a first key share and a first random number from the second device (e.g., client 12), transmitting a second key share and a second random number to the second device, transmitting a signed certificate to the second device, and generating the first secret (e.g., master secret ss0) based on the first key share, the second key share, the first random number, and the second random number.

Figure 3A:
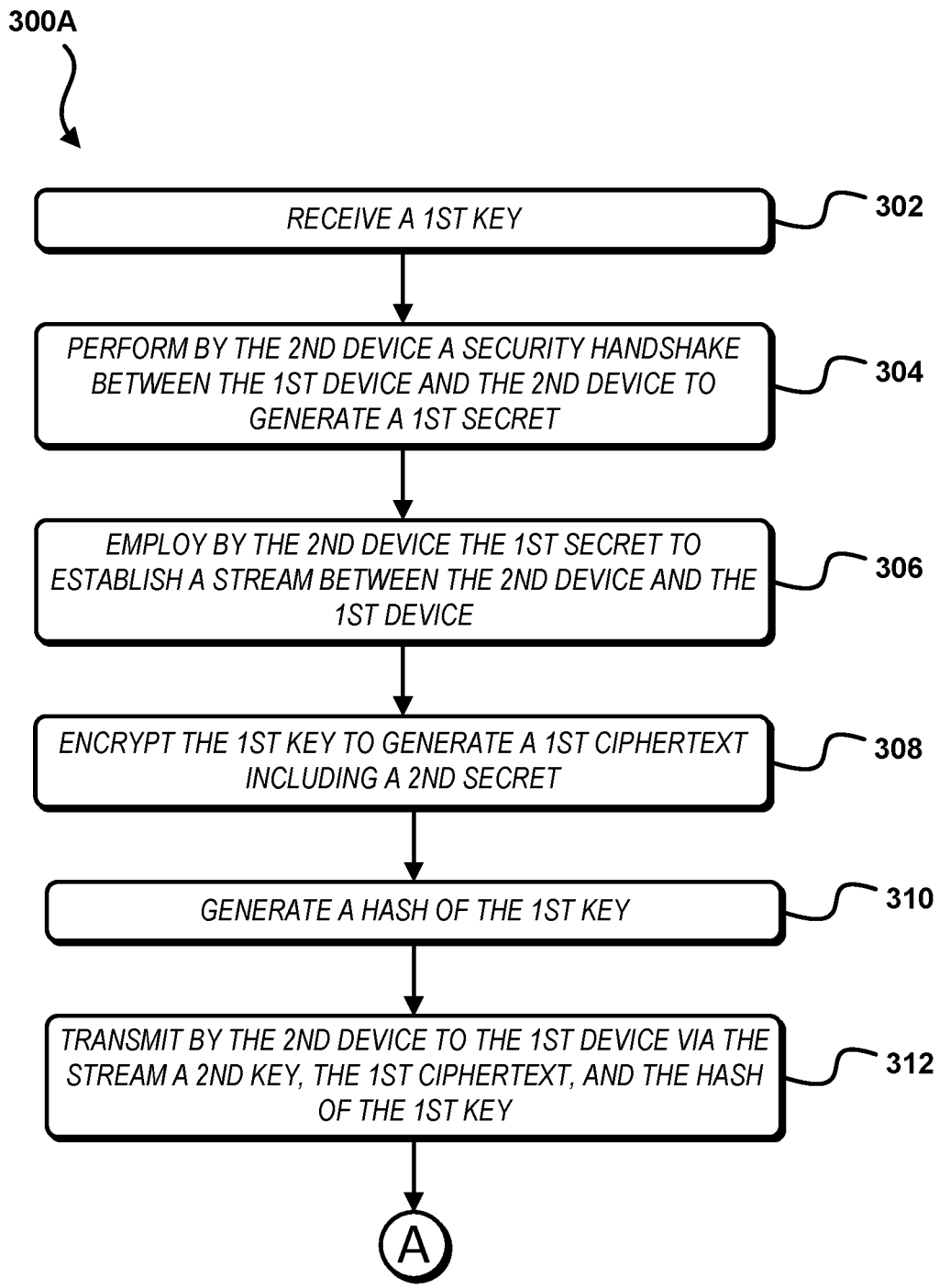
FIGS. 3A, 3B are diagrams showing another method for secure network communication.
Figure 3B:
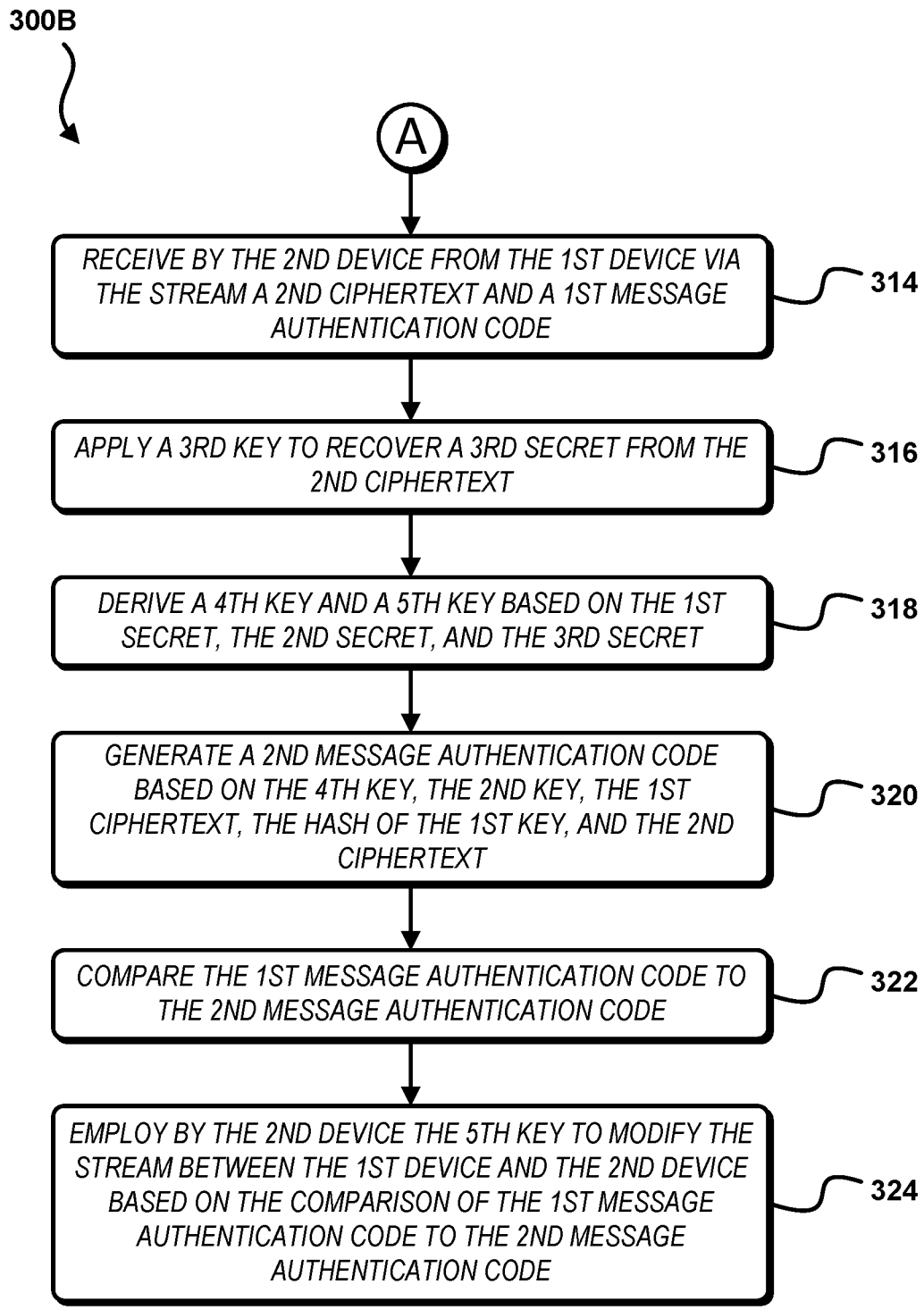

Referring to FIGS. 3A and 3B, a method 300A, 300B for secure network communication between a first device (e.g., server 40) and a second device (e.g., client 12) is shown. The method 300A, 300B is described with reference to the components (e.g., server 40, client 12) and features (e.g., master secret ss0, shared secret ss1, shared secret ss2) of the upgrade process 100. Alternatively, the method 300A, 300B can be performed via other components and features, and the method 300A, 300B is not restricted to being performed via the components and features of the upgrade process 100.

In a step 302, a first key (e.g., static public key spk) is received, for example by the second device (e.g., by client 12). In a step 304, a security handshake is performed by the second device (e.g., client 12) between the first device (e.g., server 40) and the second device to generate a first secret (e.g., master secret ss0). The handshake can be initiated by the second device (e.g., client 12), and is performed by the first device (e.g., server 40) and the second device (e.g., client 12). Alternatively, the first secret (e.g., master secret ss0) can be generated or provided in other manner without implementation of a handshake.

The first secret (e.g., master secret ss0) is employed by the second device (e.g., client 12) to establish a stream between the second device and the first device (e.g., server 40) (step 306). The stream can be established over a TLS record protocol (e.g., TLS 1.3 record protocol). The first device (e.g., server 40) also employs the first secret (e.g., master secret ss0) in establishing the stream.

The first key (e.g., static public key spk) is encrypted, for example by the second device (e.g., by client 12), to generate a first ciphertext (e.g., ciphertext c1) including a second secret (e.g., shared secret ss1) (step 308). A hash (e.g., hash(spk)) of the first key (e.g., static public key spk) is generated, for example by the second device (e.g., by client 12) (step 310).

A second key (e.g., ephemeral public key epk), the first ciphertext (e.g., ciphertext c1), and the hash (e.g., hash(spk)) of the first key (e.g., static public key spk) are transmitted by the second device (e.g., client 12) to the first device (e.g., server 40) via the stream (step 312). Beneficially, the first key (e.g., static public key spk) is a member of a key pair including the first key and a sixth key (e.g., static secret key ssk), wherein the sixth key is configured for application by the first device (e.g., server 40) to recover the second secret (e.g., shared secret ss1) from the first ciphertext (e.g., ciphertext c1).

A second ciphertext (e.g., ciphertext c2) and a first message authentication code ("MAC") are received by the second device (e.g., client 12) from the first device (e.g., server 40) via the stream (step 314). A third key (e.g., ephemeral secret key esk) is applied to recover a third secret (e.g., shared secret ss2) from the second ciphertext (e.g., ciphertext c2) (step 316). The second key (e.g., ephemeral public key epk) and the third key (e.g., ephemeral secret key esk) can be generated as a key pair. The first key (e.g., static public key spk) can be encrypted via a post-quantum key encapsulation mechanism to generate the first ciphertext (e.g., ciphertext c1) including the second secret (e.g., shared secret ss1), and the third key (e.g., ephemeral secret key esk) can be applied via the post-quantum key encapsulation mechanism to recover the third secret (e.g., shared secret ss2) from the second ciphertext (e.g., ciphertext c2). The post-quantum key encapsulation mechanism can include for example supersingular isogeny key encapsulation ("SIKE").

A fourth key (e.g., key k1) and a fifth key (e.g., key k2) are derived based on the first secret (e.g., master secret ss0), the second secret (e.g., shared secret ss1), and the third secret (e.g., shared secret ss2) (step 318). The fourth key (e.g., key k1) and the fifth key (e.g., key k2) can be derived based on the first secret (e.g., master secret ss0), the second secret (e.g., shared secret ss1), and the third secret (e.g., shared secret ss2) via a key derivation function ("KDF") based on a hash-based message authentication code ("HMAC").

A second message authentication code ("MAC") (e.g., MAC(k1, epk|c1|hash(spk)|c2)) is generated based on the fourth key (e.g., key k1), the second key (e.g., ephemeral public key epk), the first ciphertext (e.g., ciphertext c1), the hash (e.g., hash(spk)) of the first key (e.g., static public key spk), and the second ciphertext (e.g., ciphertext c2) (step 320).

The first message authentication code ("MAC") is compared to the second message authentication code ("MAC") (step 322). The fifth key (e.g., key k2) is employed by the second device (e.g., client 12) to modify the stream (e.g., over TLS 1.3 record protocol) between the first device (e.g., server 40) and the second device (e.g., client 12) based on the comparison of the first message authentication code ("MAC") to the second message authentication code ("MAC") (step 324). A match can be determined based on the comparison of the first message authentication code ("MAC") to the second message authentication code ("MAC"), and the stream (e.g., over TLS 1.3 record protocol) between the first device (e.g., server 40) and the second device (e.g., client 12) can be modified responsive to determining the match.

Figure 4:
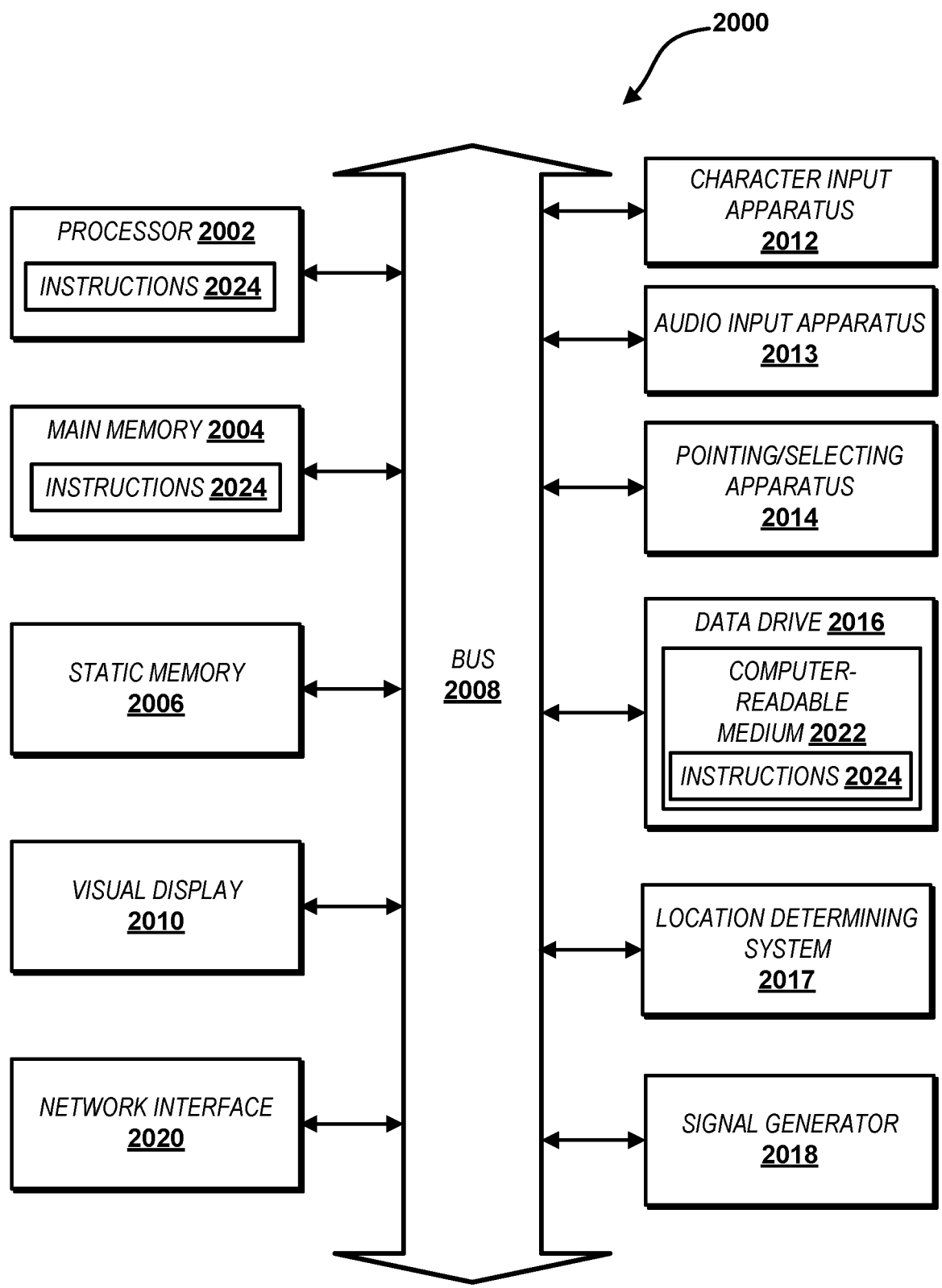
FIG. 4 shows a computer system for performing described processes and methods according to illustrative embodiments.

FIG. 4 illustrates in the abstract the function of an exemplary computer system 2000 on which the systems, methods and processes described herein can execute. For example, the client 12 and the server 40 can each be embodied by a particular computer system 2000 or a plurality of computer systems 2000. The computer system 2000 may be provided in the form of a personal computer, laptop, handheld mobile communication device, mainframe, distributed computing system, or other suitable configuration. Illustrative subject matter is in some instances described herein as computer-executable instructions, for example in the form of program modules, which program modules can include programs, routines, objects, data structures, components, or architecture configured to perform particular tasks or implement particular abstract data types. The computer-executable instructions are represented for example by instructions 2024 executable by the computer system 2000.

The computer system 2000 can operate as a standalone device or can be connected (e.g., networked) to other machines. In a networked deployment, the computer system 2000 may operate in the capacity of a server or a client machine in server-client network environment, or as a peer machine in a peer-to-peer (or distributed) network environment. The computer system 2000 can also be considered to include a collection of machines that individually or jointly execute a set (or multiple sets) of instructions to perform one or more of the methodologies described herein, for example in a cloud computing environment.

It would be understood by those skilled in the art that other computer systems including but not limited to networkable personal computers, minicomputers, mainframe computers, handheld mobile communication devices, multiprocessor systems, microprocessor-based or programmable electronics, and smart phones could be used to enable the systems, methods and processes described herein. Such computer systems can moreover be configured as distributed computer environments where program modules are enabled and tasks are performed by processing devices linked through a computer network, and in which program modules can be located in both local and remote memory storage devices.

The exemplary computer system 2000 includes a processor 2002, for example a central processing unit (CPU) or a graphics processing unit (GPU), a main memory 2004, and a static memory 2006 in communication via a bus 2008. A visual display 2010 for example a liquid crystal display (LCD), light emitting diode (LED) display, or a cathode ray tube (CRT) is provided for displaying data to a user of the computer system 2000. The visual display 2010 can be enabled to receive data input from a user for example via a resistive or capacitive touch screen. A character input apparatus 2012 can be provided for example in the form of a physical keyboard, or alternatively, a program module which enables a user-interactive simulated keyboard on the visual display 2010 and actuatable for example using a resistive or capacitive touchscreen. An audio input apparatus 2013, for example a microphone, enables audible language input which can be converted to textual input by the processor 2002 via the instructions 2024. A pointing/selecting apparatus 2014 can be provided, for example in the form of a computer mouse or enabled via a resistive or capacitive touch screen in the visual display 2010. A data drive 2016, a signal generator 2018 such as an audio speaker, and a network interface 2020 can also be provided. A location determining system 2017 is also provided which can include for example a GPS receiver and supporting hardware.

The instructions 2024 and data structures embodying or used by the herein-described systems, methods, and processes, for example software instructions, are stored on a computer-readable medium 2022 and are accessible via the data drive 2016. Further, the instructions 2024 can completely or partially reside for a particular time period in the main memory 2004 or within the processor 2002 when the instructions 2024 are executed. The main memory 2004 and the processor 2002 are also as such considered computer-readable media.

While the computer-readable medium 2022 is shown as a single medium, the computer-readable medium 2022 can be considered to include a single medium or multiple media, for example in a centralized or distributed database, or associated caches and servers, that store the instructions 2024. The computer-readable medium 2022 can be considered to include any tangible medium that can store, encode, or carry instructions for execution by a machine and that cause the machine to perform any one or more of the methodologies described herein, or that can store, encode, or carry data structures used by or associated with such instructions. Further, the term "computer-readable storage medium" can be considered to include, but is not limited to, solid-state memories and optical and magnetic media that can store information in a non-transitory manner Computer-readable media can for example include non-volatile memory such as semiconductor memory devices (e.g., magnetic disks such as internal hard disks and removable disks, magneto-optical disks, CD-ROM and DVD-ROM disks, Erasable Programmable Read-Only Memory (EPROM), Electrically Erasable Programmable Read-Only Memory (EEPROM), and flash memory devices).

The instructions 2024 can be transmitted or received over a computer network using a signal transmission medium via the network interface 2020 operating under one or more known transfer protocols, for example FTP, HTTP, or HTTPs. Examples of computer networks include a local area network (LAN), a wide area network (WAN), the internet, mobile telephone networks, Plain Old Telephone (POTS) networks, and wireless data networks, for example Wi-Fi™ and 3G/4G/5G cellular networks. The term "computer-readable signal medium" can be considered to include any transitory intangible medium that is capable of storing, encoding, or carrying instructions for execution by a machine, and includes digital or analog communications signals or other intangible medium to facilitate communication of such instructions.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims.

What is claimed is:

1. A computer-implemented method for secure network communication in a communication session, the computer-implemented method comprising:

performing by a first device a security handshake between the first device and a second device to generate a first secret;

employing by the first device the first secret to establish a stream between the first device and the second device;

receiving from the second device by the first device via the stream a third key, a first ciphertext based on an encryption of a first key, and a hash of the first key;

applying a second key to recover a second secret from the first ciphertext;

encrypting the third key to generate a second ciphertext comprising a third secret;

deriving a key pair comprising a fourth key and a fifth key based on the first secret, the second secret, and the third secret;

generating a message authentication code based on the fourth key, the third key, the first ciphertext, the hash of the first key, and the second ciphertext;

transmitting by the first device to the second device via the stream the second ciphertext and the message authentication code; and employing by the first device the fifth key to modify the stream between the first device and the second device.

2. The method of claim 1, wherein:
the communication session is a Transport Layer Security ("TLS") session; and
the security handshake is a TLS handshake.

3. The method of claim 1, further comprising establishing the stream over a TLS record protocol.

4. The method of claim 1, wherein the first secret is symmetric, and the fifth key is symmetric.

5. The method of claim 1, further comprising appending the fifth key to the first secret to modify the stream between the first device and the second device.

6. The method of claim 1, further comprising replacing the first secret with the fifth key to modify the stream between the first device and the second device.

7. The method of claim 1, wherein the performing by the first device of the security handshake comprises:
receiving a first key share and a first random number from the second device;
transmitting a second key share and a second random number to the second device;
transmitting a signed certificate to the second device; and
generating the first secret based on the first key share, the second key share, the first random number, and the second random number.

8. The method of claim 1, wherein:
the first key comprises a first public key;
the second key comprises a first private key; and
the third key comprises a second public key.

9. The method of claim 1, further comprising applying the second key via a post-quantum key encapsulation mechanism to recover the second secret from the first ciphertext.

10. The method of claim 9, wherein the second secret comprises a static secret.

11. The method of claim 9, further comprising encrypting the third key via the post-quantum key encapsulation mechanism to generate the second ciphertext comprising the third secret.

12. The method of claim 11, wherein the third secret comprises an ephemeral secret.

13. The method of claim 11, wherein the post-quantum key encapsulation mechanism comprises supersingular isogeny key encapsulation ("SIKE").

14. The method of claim 1, further comprising deriving the fourth key and the fifth key based on the first secret, the second secret, and the third secret via a key derivation function ("KDF") based on a hash-based message authentication code ("HMAC").

15. The method of claim 1, further comprising providing the first key and the second key as a first key pair comprising a first public key and a first private key.

16. The method of claim 15, further comprising deriving the fourth key and the fifth key as a second key pair.

17. The method of claim 1, wherein the security handshake is initiated by the second device.

18. The method of claim 1, wherein:
the first key and the second key are static keys; and
the third key is an ephemeral key.

19. The method of claim 1, wherein generating the message authentication code comprises:
providing a message authentication code generator;
inputting as a first input the fourth key to the message authentication code generator;
concatenating the third key, the first ciphertext, the hash of the first key, and the second ciphertext to form a concatenated string;
inputting as a second input the concatenated string to the message authentication code generator; and
generating the message authentication code by the message authentication code generator based on the first input and the second input.

20. A computer-implemented method for secure network communication between a first device and a second device, the computer-implement method comprising:
receiving a first key;
performing by the second device a security handshake between the first device and the second device to generate a first secret;
employing by the second device the first secret to establish a stream between the second device and the first device;
encrypting the first key to generate a first ciphertext comprising a second secret;
generating a hash of the first key;
transmitting by the second device to the first device via the stream a second key, the first ciphertext, and the hash of the first key;
receiving by the second device from the first device via the stream a second ciphertext and a first message authentication code;
applying a third key to recover a third secret from the second ciphertext;
deriving a fourth key and a fifth key based on the first secret, the second secret, and the third secret;
generating a second message authentication code based on the fourth key, the second key, the first ciphertext, the hash of the first key, and the second ciphertext;
comparing the first message authentication code to the second message authentication code; and
employing by the second device the fifth key to modify the stream between the first device and the second device based on the comparison of the first message authentication code to the second message authentication code.

21. The method of claim 20, further comprising generating the second key and the third key as a key pair.

22. The method of claim 20, further comprising encrypting the first key via a post-quantum key encapsulation mechanism to generate the first ciphertext comprising the second secret.

23. The method of claim 22, further comprising applying the third key via the post-quantum key encapsulation mechanism to recover the third secret from the second ciphertext.

24. The method of claim 22, wherein the post-quantum key encapsulation mechanism comprises supersingular isogeny key encapsulation ("SIKE").

25. The method of claim 20, further comprising
determining a match based on the comparison of the first message authentication code to the second message authentication code; and
modifying the stream between the first device and the second device responsive to determining the match.

26. The method of claim 20, further comprising deriving the fourth key and the fifth key based on the first secret, the second secret, and the third secret via a key derivation function ("KDF") based on a hash-based message authentication code ("HMAC").

27. The method of claim 20, wherein the first key is a member of a key pair comprising the first key and a sixth key, the sixth key configured for application by the first device to recover the second secret from the first ciphertext.

28. A computer-implemented method for secure network communication in a Transport Layer Security ("TLS") session, the computer-implemented method comprising:
- providing a first key pair comprising a first public key and a first private key;
- performing by a server device a TLS handshake between the server device and a client device to generate a first secret;
- employing by the server device the first secret to establish a stream between the server device and the client device;
- receiving from the client device by the server device via the stream a second public key, a first ciphertext based on an encryption of the first public key, and a hash of the first public key;
- applying the first private key to recover a second secret from the first ciphertext;
- encrypting the second public key to generate a second ciphertext comprising a third secret;
- deriving a second key pair comprising a first particular key and a second particular key based on the first secret, the second secret, and the third secret;
- generating a message authentication code based on the first particular key, the second public key, the first ciphertext, the hash of the first public key, and the second ciphertext;
- transmitting by the server device to the client device via the stream the second ciphertext and the message authentication code; and
- employing by the server device the second particular key to modify the stream between the server device and the client device.

29. A system, comprising:
one or more processors; and
memory storing executable instructions that, as a result of being executed, cause the system to perform operations comprising:
- performing by a first device a security handshake between the first device and a second device to generate a first secret;
- employing by the first device the first secret to establish a stream between the first device and the second device;
- receiving from the second device by the first device via the stream a third key, a first ciphertext based on an encryption of a first key, and a hash of the first key;
- applying a second key to recover a second secret from the first ciphertext;
- encrypting the third key to generate a second ciphertext comprising a third secret;
- deriving a key pair comprising a fourth key and a fifth key based on the first secret, the second secret, and the third secret;
- generating a message authentication code based on the fourth key, the third key, the first ciphertext, the hash of the first key, and the second ciphertext;
- transmitting by the first device to the second device via the stream the second ciphertext and the message authentication code; and
- employing by the first device the fifth key to modify the stream between the first device and the second device.

30. A non-transitory computer-readable storage medium storing executable instructions for enabling secure network communication between a first device and a second device, the instructions executable by one or more processors to perform operations comprising:
- receiving a first key;
- performing by the second device a security handshake between the first device and the second device to generate a first secret;
- employing by the second device the first secret to establish a stream between the second device and the first device;
- encrypting the first key to generate a first ciphertext comprising a second secret;
- generating a hash of the first key;
- transmitting by the second device to the first device via the stream a second key, the first ciphertext, and the hash of the first key;
- receiving by the second device from the first device via the stream a second ciphertext and a first message authentication code;
- applying a third key to recover a third secret from the second ciphertext;
- deriving a fourth key and a fifth key based on the first secret, the second secret, and the third secret;
- generating a second message authentication code based on the fourth key, the second key, the first ciphertext, the hash of the first key, and the second ciphertext;
- comparing the first message authentication code to the second message authentication code; and
- employing by the second device the fifth key to modify the stream between the first device and the second device based on the comparison of the first message authentication code to the second message authentication code.

31. A computer-implemented method for secure network communication in a communication session, the computer-implemented method comprising:
- employing by a first device a first secret to establish a stream between the first device and a second device;
- receiving from the second device by the first device via the stream a third key, a first ciphertext based on an encryption of a first key, and a hash of the first key;
- applying a second key to recover a second secret from the first ciphertext;
- encrypting the third key to generate a second ciphertext comprising a third secret;
- deriving a key pair comprising a fourth key and a fifth key based on the first secret, the second secret, and the third secret;
- generating a message authentication code based on the fourth key, the third key, the first ciphertext, the hash of the first key, and the second ciphertext;
- transmitting by the first device to the second device via the stream the second ciphertext and the message authentication code; and
- employing by the first device the fifth key to modify the stream between the first device and the second device.

* * * * *